United States Patent [19]
Depmeyer

[11] 3,782,440
[45] Jan. 1, 1974

[54] PNEUMATIC VEHICLE TIRE

[75] Inventor: Lothar Depmeyer, Garbsen, Germany

[73] Assignee: Continental Gummi-Werke Aktiengesellschaft, Hannover, Germany

[22] Filed: Mar. 20, 1972

[21] Appl. No.: 236,054

[30] Foreign Application Priority Data
Mar. 20, 1971 Germany............. P 21 13 627.6

[52] U.S. Cl............... 152/330, 152/354, 152/357
[51] Int. Cl............................................... B60c 9/14
[58] Field of Search.............. 152/330, 352, 353, 152/354, 356, 357, 359

[56] References Cited
UNITED STATES PATENTS

| | | | |
|---|---|---|---|
| 1,827,668 | 10/1931 | Musselman | 152/330 |
| 3,052,274 | 9/1962 | Lang | 152/354 |
| 973,278 | 10/1910 | Kempshall | 152/353 |
| 1,836,091 | 12/1931 | Shoemaker | 152/352 |

*Primary Examiner*—Gerald M. Forlenza
*Assistant Examiner*—Robert Saifer
*Attorney*—Walter Becker

[57] ABSTRACT

A pneumatic vehicle tire, in which the side walls consist of rubber material only without having strength members members embedded therein, but are reinforced by ribs on the inside of the side walls and integral therewith.

7 Claims, 10 Drawing Figures

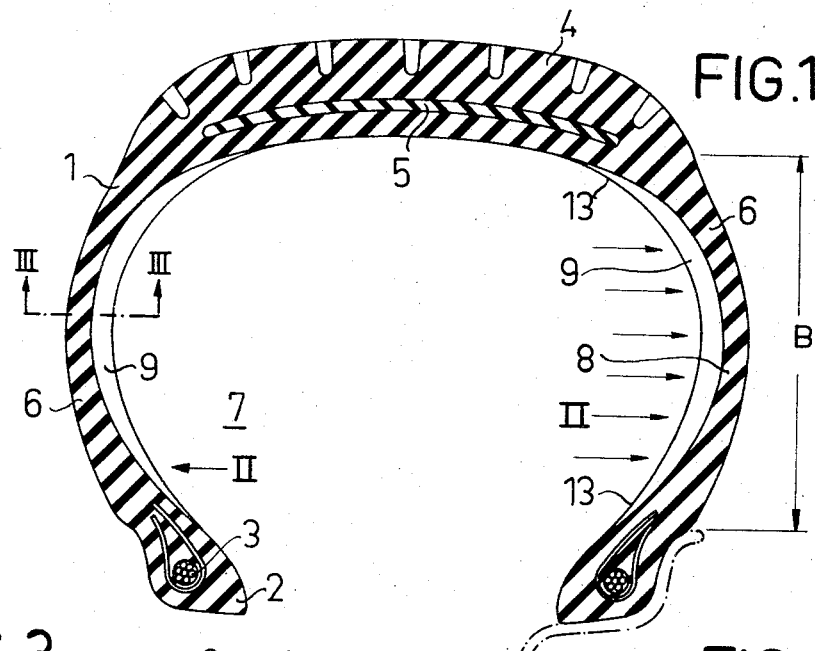
FIG.1
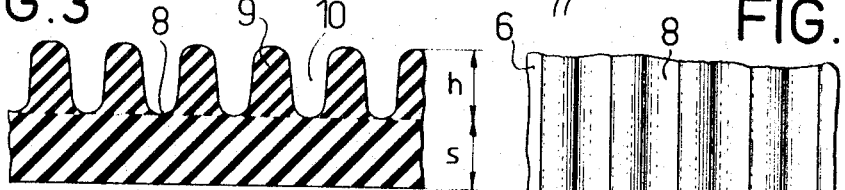
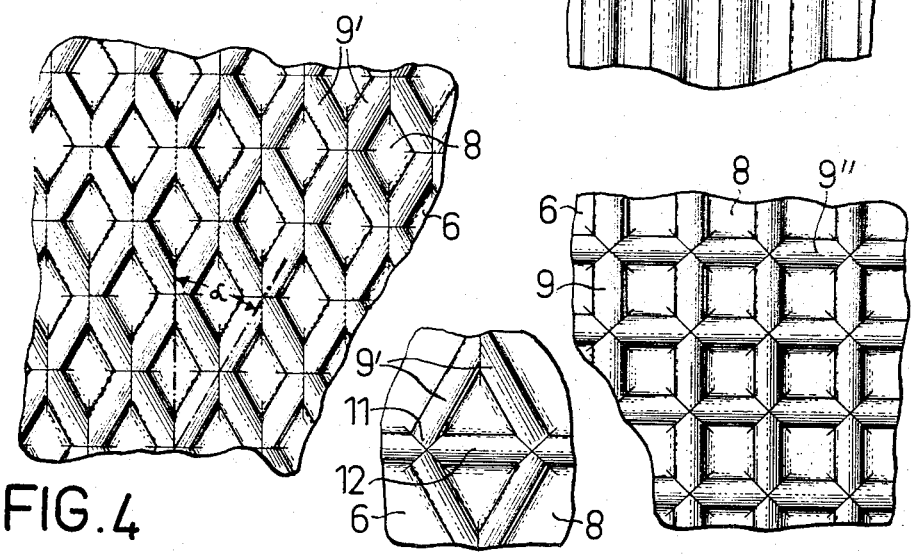

PNEUMATIC VEHICLE TIRE

The present invention relates to a pneumatic vehicle tire which below the tread strip is provided with an annular pull-resistant reinforcing insert extending substantially over the width of the tread strip, the tire having at least partially non-reinforced side walls.

With heretofore known tires of this type the non-reinforced sections of the side walls consist exclusively of rubber or rubber-like materials. The side walls have on their inside and on their outside smooth surfaces which, if desired, may be provided with ornaments which, however, as far as strength is concerned have no influence on the tire side walls.

These heretofore known tires are only then safe for driving when the sections of the tire side walls which consist of rubber or the like have a sufficient strength. Under the influence of the inner pressure of the tire and under the influence of the forces inherent to the driving operation, the side walls must not be overly stretched in order to avoid a premature destruction of the tire. It is difficult to meet this requirement because the thickness of the side walls cannot be selected at will and must not exceed a certain thickness because otherwise too much material would have to be used and also the deformability of the side walls would be harmfully affected.

It is, therefore, an object of the present invention to improve pneumatic vehicle tires of the above described type by a special construction of the side walls in such a way that they will have a sufficient strength and flexibility while avoiding an undue accumulation of material.

This object and other objects and advantages of the invention will appear more clearly from the following specification in connection with the accompanying drawings, in which:

FIG. 1 is a partial section through a pneumatic vehicle tire according to the invention.

FIG. 2 is a partial view of a tire side wall as seen in the direction of the arrows II of FIG. 1.

FIG. 3 represents a section taken along the line III—III of FIG. 1.

FIGS. 4, 5 and 6 represent views of tire side walls as seen from the inside of the tire while various modifications of the reinforcing ribs according to the invention are shown.

Figure 7:
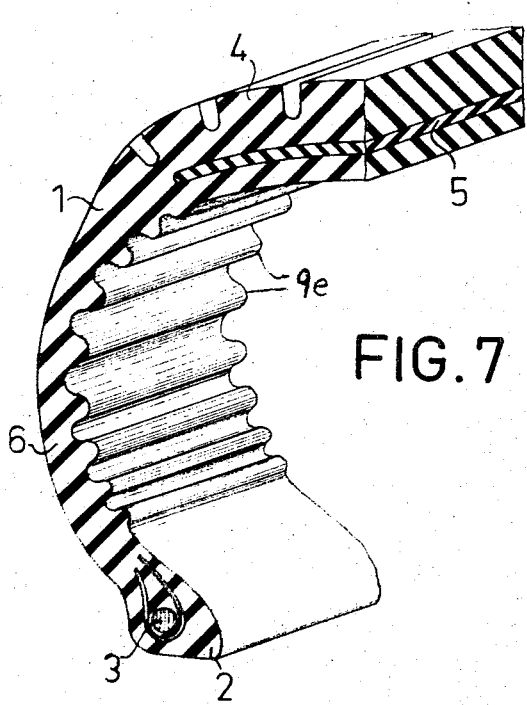
Figure 8:
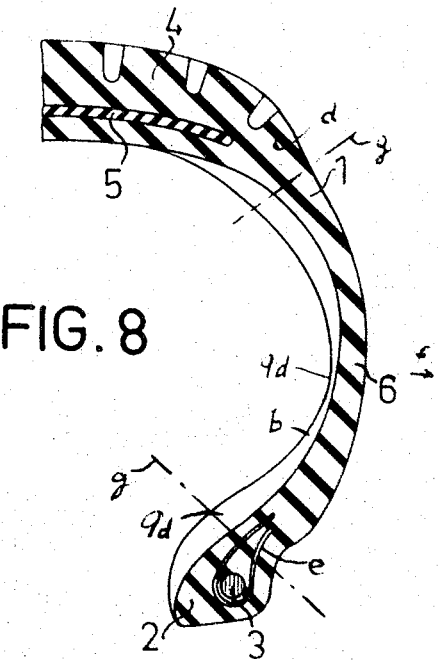

FIGS. 7 and 8 respectively illustrate two further modifications of the ribs inside the side walls of the tire, which ribs extend radially with regard to the tread area of the tire. According to FIG. 7 the ribs have their greatest cross section at the outer side wall portions, whereas according to FIG. 8 the ribs have their greatest cross section along the middle sections of the side walls. According to the design of FIG. 8, additional shorter ribs are provided between each two adjacent longer ribs.

Figure 9:
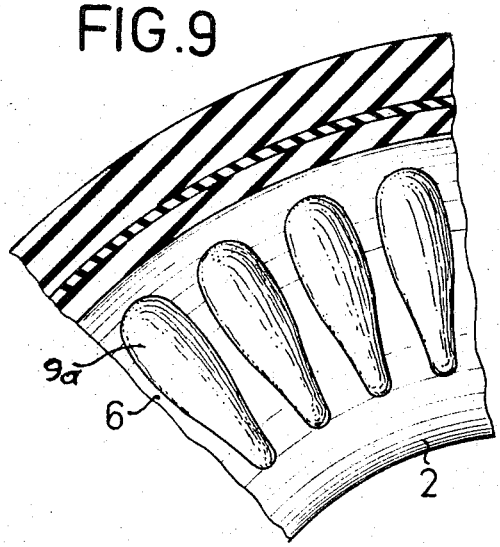

FIG. 9 illustrates a modified tire of the invention according to which the ribs extending transverse to the circumferential direction of the tire are designed as "beams of uniform resistance".

Figure 10:
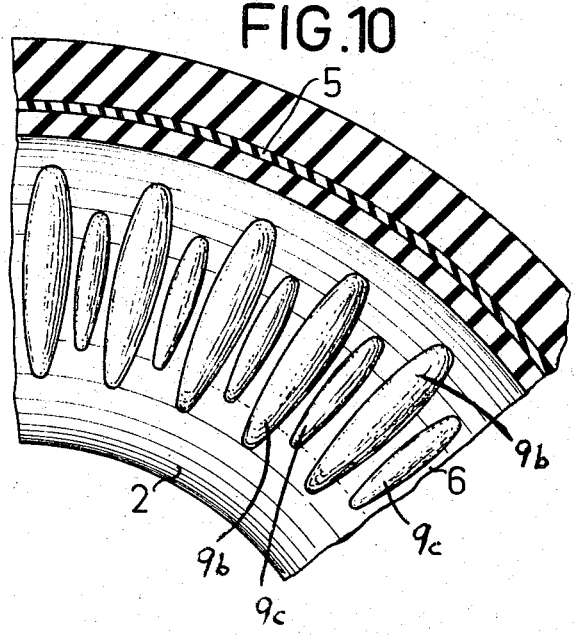

FIG. 10 illustrates a further modified tire having longer and shorter ribs alternately along an inner wall thereof.

The pneumatic vehicle tire according to the present invention is characterized primarily in that that part of the side walls which is not reinforced by strength members, such as cords, is reinforced by reinforcing ribs. Expediently, the reinforcing ribs are so dimensioned that the height of the ribs corresponds substantially to the wall thickness of the side walls proper.

These reinforcing ribs which are preferably provided on the inner surface, i.e., that surface of the tire side walls which faces the interior or the hollow chamber of the tire, bring about a reinforcement of the side walls of the tire having no reinforcing strength members without the danger that undesired accumulations of material occur. The side walls are very flexible, have a satisfactory strength, and in addition thereto heat accumulations are excluded.

If the tire side walls have a relatively great height, the reinforcing ribs according to the invention are preferably so arranged that they extend at a right angle or at an inclination to the circumferential direction of the tire. If, on the other hand, the tire body has a relatively flat cross section and consequently short tire side walls, the reinforcing ribs may be designed as concentric rings.

Inasmuch as the tires are anyhow pressed to shape in a vulcanizing mold, no difficulties are encountered with regard to the shaping of the reinforcing ribs according to the invention. It is also possible for the ribs to select a material which has a hardness greater than the hardness of the material from which the side walls proper are made. Thus, preferably, the material of which the ribs are made may have a hardness which is greater than the hardness of the side walls proper by from 10 to 20 shore-hardness-degree A.

Referring now to the drawing in detail, the pneumatic vehicle tire 1 of rubber or rubber-like material which in use is under an overpressure is provided with beads 2 containing pull-resistant bead cores 3 while below the tread strip 4 there is provided a pull-resistant belt 5 which extends substantially over the width of the thread strip 4. On the other hand, the side walls consist exclusively of rubber or rubber-like material, in other words have no strength members embedded therein in the form of cords or the like.

The inner sides of the tire side walls 6, in other words the surface 8 which faces the hollow chamber 7, is provided with reinforcing ribs extending parallel with regard to each other, these ribs 9 being formed-on during the molding process proper of the tire body 1. These reinforcing ribs 9 may consist of the same material as the tire side walls 6 but preferably with the difference that the hardness of the ribs 9 is by 15 shore-hardness degrees A higher than the hardness of the side walls 6 proper.

The ribs 9 which are located substantially parallel to each other extend approximately at a right angle to the tire circumferential direction and have a height $h$ which corresponds to the wall thickness $s$ of the sidewalls 6. Moreover, the free space 10 between adjacent ribs 9 is so dimensioned that its cross section approximately equals the cross section of the ribs 9. Preferably the ribs 9 are so designed that their width decreases toward the free end of the ribs 9.

According to FIG. 4, the reinforcing ribs according to the invention are formed by parallel intercrossing ribs 9' which together with the transverse direction of the tire form an angle $\alpha$ of approximately 20° to 40°.

According to FIG. 5, the ribs 9 and 9" extend practically at a right angle with regard to each other. The ribs 9 extending in one direction are located transverse to the circumferential direction of the tire, whereas the reinforcing ribs 9'' extending in the other direction are circumferential ribs.

According to FIG. 6, between the crossing or node points 11 there are provided connecting ribs 12 which have the tendency to maintain the mutual distance between adjacent crossing points 11. If desired, the ribs 9 may also be arranged as concentric elements which means elements extending in the circumferential direction of the tire. Moreover, different arrangements of the ribs may follow each other over the height of the side walls 6. Thus, a distribution of the ribs may be selected, for instance, in which the arrangements of the ribs according to FIGS. 2 and 4, when seen in the radial direction of the tire, follow each other.

According to FIG. 1, that diameter range along which the tire side walls 6 extend is designated with the character B. The marginal areas of this range B are determined by the belt 5 the diameter of which is fixed and cannot be increased during the operation of the tire and the bead cores 3 or the pertaining rim beads, and they are not subject to a bulging out toward the side by the inner pressure of the tire. Since, however, the ribs 9 are located in the region B and since these ribs, especially if they have a greater hardness or greater pressure modulus than that of the material of which the tire side walls 6 proper are made, have a certain stiffness, this side wall will have a considerably increased bending resistance. To realize this goal, the ribs 9a may also have a larger cross-sectional surface toward the belt 5 as shown in FIG. 7, or the number of the ribs may be increased toward the larger diameter of the side wall 6. To this end, for instance, between adjacent ribs 9b (FIG. 10) there may be provided a further additional rib 9c which could also be provided with an arrangement of the ribs 9 in conformity with FIG. 2, because these ribs 9b must in the region of the largest diameter of the tire side walls 6 be spaced from each other by a distance which is greater than the distance by which they are spaced from each other in that region of the side wall 6 which faces toward the bead cores 3.

According to the present invention, the reinforcing ribs 9d (FIG. 9) may also be so designed that they form a support of uniform or approximately uniform bending resistance. As will be seen from FIG. 9, at 9c the bulging in the direction f will be greatest with regard to the tire shoulders d and tire beads e. The ribs 9d may be considered as beams clamped in at the ranges e and g. At these ranges, the ribs have their greatest thickness, said thickness decreasing toward the middle range of the tire side walls.

Furthermore, the ribs 9 may, in conformity with FIG. 1, decrease in height so as to finally merge with the beads 2 and the tread strip 4 as illustrated at 13 in FIG. 1 so that the ribs, when seen from the side, have a somewhat crescent-shaped configuration.

Finally, according to FIG. 10, the ribs 9c may be designed in the form of concentric rings extending over the entire circumferential inner side wall area.

It is, of course, to be understood that the present invention is, by no means, limited to the particular showing in the drawing but also comprises any modifications within the scope of the appended claims.

What I claim is:

1. A pneumatic vehicle tire including mounting beads and tire shoulders radially outwardly thereof which includes: a tread strip located centrally between the tire shoulders, annular pull resistant strength means arranged radially inwardly of said tread strip and extending edge to edge approximately over the width of said tread strip, and side walls having at least portions free from embedded strength members, said portions being provided with reinforcing ribs located close by to each other with spacing relative to each other corresponding approximately to rib width and located internally extending radially between respectively beads and as far as below only the edge of said annular pull resistant strength means with rib height diminishing toward opposite ends in an acute manner out of the ends thereof.

2. A tire according to claim 1, in which the maximum height of said ribs approximately equals the thickness of the thinnest side wall portion.

3. A tire according to claim 1, in which the reinforcing ribs have a greater Shore hardness than the tire side wall proper.

4. A tire according to claim 3, in which the Shore hardness of said ribs is by from 10 to 20 Shore hardness degrees greater than that of the tire side walls proper.

5. A tire according to claim 1, in which the cross section of said reinforcing ribs varies along the length thereof.

6. A tire according to claim 1, in which the thickness of said side walls and of the reinforcing ribs therefor is so selected that said side walls together with the ribs pertaining thereto form supports of approximately uniform bending resistance.

7. A tire according to claim 1, in which said reinforcing ribs have a crescent contour.

* * * * *